March 17, 1953 J. H. WERNIG 2,631,887
HINGED FINISH MOLDING FOR VEHICLE CLOSURES
Filed Dec. 1, 1951 2 SHEETS—SHEET 1
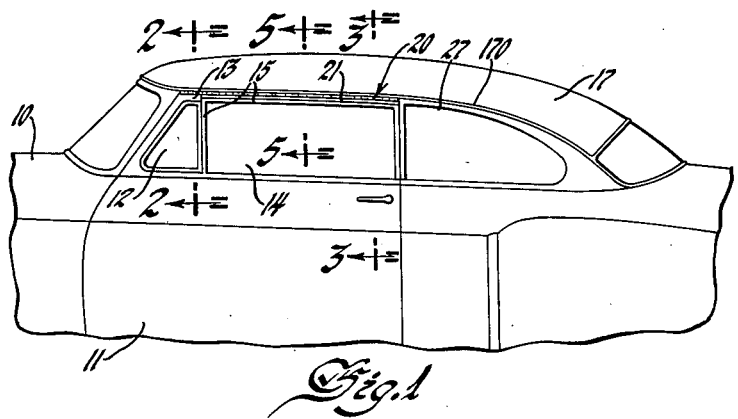
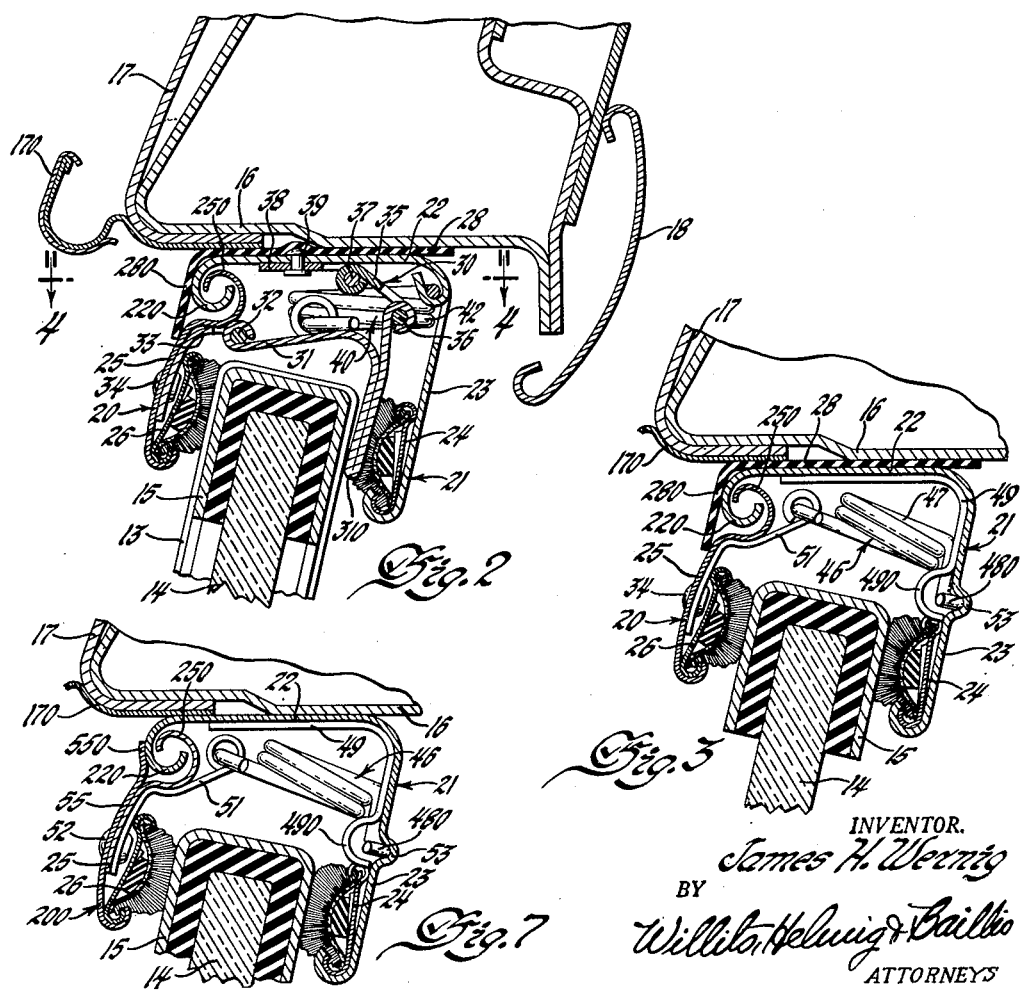
INVENTOR.
James H. Wernig
BY
Willis, Helwig & Baillie
ATTORNEYS March 17, 1953 — J. H. WERNIG — 2,631,887
HINGED FINISH MOLDING FOR VEHICLE CLOSURES
Filed Dec. 1, 1951 — 2 SHEETS—SHEET 2
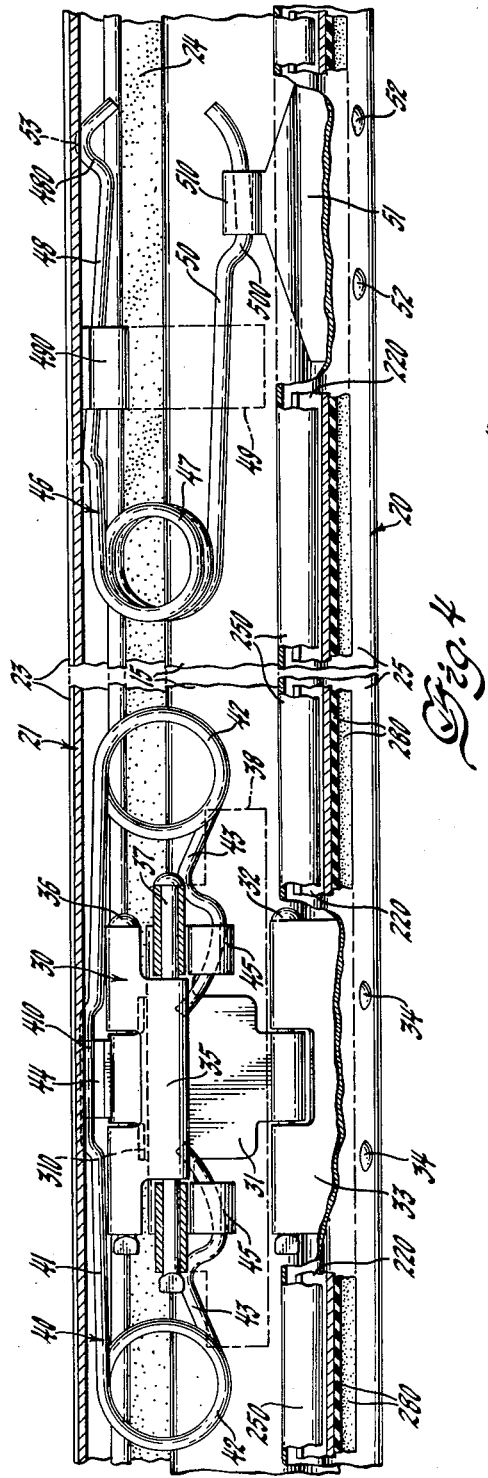
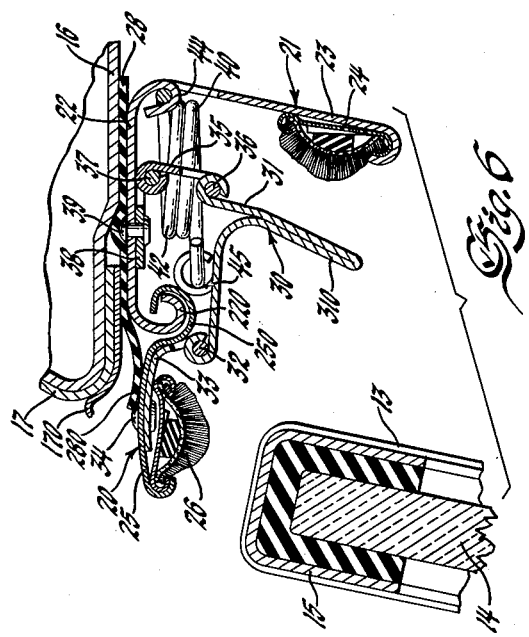
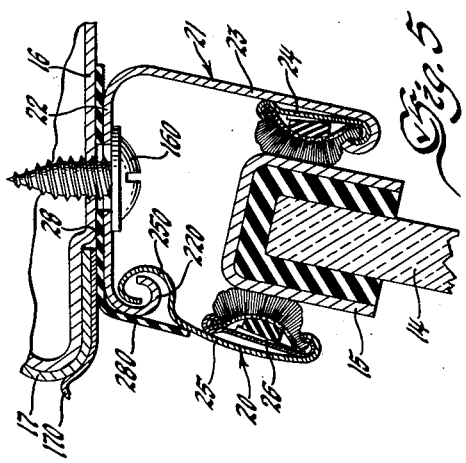
INVENTOR.
James H. Wernig
BY
Willis, Helwig & Baillio
ATTORNEYS Patented Mar. 17, 1953

2,631,887

UNITED STATES PATENT OFFICE 2,631,887

HINGED FINISH MOLDING FOR VEHICLE CLOSURES

James H. Wernig, Bloomfield Village, Mich., assignor to General Motors Corporation, Detroit, Mich., a corporation of Delaware Application December 1, 1951, Serial No. 259,423

29 Claims. (Cl. 296—44.5)

This invention relates to hinged finish moldings for automobiles, and in particular to means for finishing and weather sealing the joint between the top of the vertically opening door window and the door header of automobile bodies.

In automobile bodies such as the "hard top" type, the finishing and sealing of the top of the vertically opening door window of the automobile door at the door header has not proven entirely satisfactory. The particular body construction referred to employs outwardly swinging doors including a fixed frame at the upper front end of the door into which is pivotally mounted a "controlled ventilation" or "no draft" window element and a vertically sliding window rearwardly adjacent the controlled ventilation window frame. The automobile door carries no window header for the vertically opening door window, however, the door header sometimes formed as an integral part of the roof rail serves as and takes the place of a window header for the vertically opening door window.

The primary object of the invention is to provide in automobile body construction hinged finish moldings to accomplish improved weather sealing at the joint between the top of a vertically opening door window and the door header thereabove, and to enhance the esthetic appearance of the automobile body trim line at the door header above the vertically opening door window.

Another object of the invention is to provide a hinged finish molding carried by an automobile door header for receiving the top of a vertically opening automobile door window, the outer member of the molding being hinged and spring urged to swing outwardly to a horizontal position upon opening the door to permit the opening and closing of the door when the window is closed, and actuating means engageable by a fixed door member to swing the said outer member of the finish molding to its vertical position when the door is closed.

A further object of the invention is to provide a hinged finish molding including weather stripping forming a glass channel at the door header of an automobile for receiving the vertically sliding door window when closed, the outer member of the said molding being hinged to swing outwardly responsive to the opening of the door whereby to permit the door to be opened when the window thereof is closed and to swing downwardly responsive to closing the door to form a glass channel to receive and weather seal the top of the door window.

Other objects of the invention will become apparent by reference to the following detailed description taken in connection with the accompanying drawings, in which:

Fig. 1 is a fragmentary side elevational view of an automobile having its door header equipped with a hinged finish molding embodying the invention.

Fig. 2 is an enlarged vertical sectional view taken substantially on the line 2—2 of Fig. 1 at the fixed controlled ventilation window frame showing one type of spring loaded actuating mechanism usable to actuate the hinged finish molding, the vertically sliding door window at the rear of the fixed controlled ventilation window frame located in a different plane being shown to indicate that only a fixed element of the door contacts the lever of the hinged finish molding actuating mechanism.

Fig. 3 is a vertical sectional view taken on the lines 3—3 of Fig. 1 showing over-center spring means that may be employed to assist maintaining the hinged finish molding in either its open or its closed position.

Fig. 4 is a fragmentary horizontal sectional view of the hinged finish molding shown in Figs. 1-3 inclusive taken on the line 4—4 of Fig. 2.

Fig. 5 is a vertical sectional view taken on the line 5—5 of Fig. 1.

Fig. 6 is a vertical sectional view similar to Fig. 2 showing the outer panel of the hinged finish molding swung outwardly as when the door is open.

Fig. 7 is a vertical sectional view similar to Fig. 3 showing an alternate means for flashing the hinge joint.

Referring now to the drawings wherein like numerals refer to like and corresponding parts throughout the several views, the particular embodiments of the invention are shown therein for illustrative purposes in connection with a hard top type automobile body 10 having a door 11 hinged to the body 10 at the front thereof. The door 11 is provided with a controlled ventilation or no draft window 12 pivotally mounted in a fixed frame 13 and a vertically sliding window 14 having an ornamental metal trim strip 15. The said door 11 is not provided with a window header, the door header 16 of the hard top 17 serving both as door header and as a header for vertically sliding window 14. Outwardly of the door header 16 secured to the hard top 17 is the usual drip molding or rain gutter 17G, and inwardly thereof may be provided an interior trim molding 18.

In the illustrative construction embodying the invention shown in Figs. 1-6 inclusive, a hinged finish molding 20 is provided which comprises a fixed angular anchorage strip 21 secured along one of its legs 22 to the door header 16 by such means as screws 16G with its other leg 23 thereof depending therefrom to which is secured a suitable weather strip element 24, and a swingable strip 25 hingedly connected to said angular anchorage strip 21 along the leg 22 thereof and to which is secured a suitable weather strip element 26. When the swingable strip 25 is swung to a position substantially parallel to the depending leg 23 of the angular anchorage strip 21, the said weather strip elements 24 and 26 are disposed in opposite spaced relationship, and the said hinged finish molding forms and provides a glass channel to receive and weather seal the upper edge of the vertically sliding door window 14 at the trim molding 15 thereof.

The hinged connection of the swingable strip 25 to the anchorage strip 21 is illustrated to be accomplished by providing the leg 22 of the anchorage strip 21 and the upper portion of the swingable strip 25 with complementary hinge rolls 220 and 250 respectively. Obviously, other types of hinge construction may be employed. The anchorage strip 21 and the swingable strip 25 may be formed of stainless steel, both preferably having their free edges rolled for rigidity and to engage the lower edges of the weather strip elements 24 and 26 respectively. The width of the swingable strip 25 is preferably such that, when swung to a depending position, the lower rolled edge thereof is disposed in alignment with the rear side window ornamental trim strip 27 of the automobile body 10. A flashing element 28 of flexible rubber, neoprene or other suitable material is positioned between the door header 16 and the leg 22 of the anchorage strip 21 and has a resilient depending outer flange 280 extending over the hinge rolls 220 and 250 and into contact with the outside of the swingable strip 25 below the hinge roll 250 thereof to weather and dust seal the hinged finish molding at the hinge thereof.

A suitable actuating mechanism for the hinged finish molding 20 generally designated by the numeral 30 is preferably located opposite the rear of the controlled ventilation window frame 13 and normally urges the swingable strip 25 to an outwardly disposed horizontal position shown in Fig. 6. The said actuating mechanism 30 is also employed to swing the said swingable strip 25 to its downward disposed position shown in Fig. 2 responsive to the closing of the door 11. The actuating mechanism 30 includes a lever 31 formed to provide a contact element 310 contactable by the controlled ventilation window frame 30 or some other fixed element on the door 11 when the said door 11 is closed causing the actuating mechanism 30 to swing the swingable strip 25 from its horizontal position shown in Fig. 6 to a depending position as shown in Figs. 2, 3 and 5.

When the swingable strip 25 is in its depending position, there is formed within the hinged finish molding 20 a weather stripped glass channel for the upper edge of the vertically sliding door window 14 at the trim molding 15 thereof. If the sliding door window 14 is open (down) when the door 11 is closed, the glass channel formed within the hinged finish molding 20 is ready for receiving the upper trim molding 15 of the sliding door window 14 when the said sliding door window 14 is raised to its closed position. However, if the sliding door window 14 is already closed (up) when the door 11 is open, the inside surface of the upper trim molding 15 of the sliding door window 14 swings with the closing of the door 11 into abutment with the weather strip element 24 on the depending leg 23 of the fixed anchorage strip 21 and the weather strip element 26 carried by the swingable strip 24 is swung by the final closing movement of the door 11 into abutment with the outer surface of the upper trim molding 15 of the sliding door window 14. Obviously, whenever the door 11 is opened even a slight distance, the swingable strip 25 swings outwardly to its horizontal position shown in Fig. 6 whereby to provide clearance for the top of the sliding door window 14 if in its raised position when the door 11 is opened.

The particular actuating mechanism 30 employed to move the swingable strip 25 in the manner hereinbefore described is disclosed in Figs. 2, 4 and 6 and comprises a lever 31 which is hingedly connected at one end thereof by a hinge pin 32, a clip 33 and rivets 34 to the inside of the swingable strip 25 and is connected at the other end thereof to the bottom of the horizontal leg 22 of the fixed anchorage strip 21 by a link 35, hinge pins 36 and 37 and a clip 38, the said clip 38 being secured to the leg 22 of the anchorage strip 21 by such means as rivets 39. The lever 31 is suitably formed between the hinge pins 32 and 36 to provide the contact element 310 contactable by a fixed element on the door 11 such as the controlled ventilation window frame 12 for moving the swingable strip 25 from its spring loaded horizontal outward position shown in Fig. 6 to its depending generally vertical position shown in Fig. 2. The spring pressure for spring loading and constantly urging the swingable strip 25 toward its horizontal outward position shown in Fig. 6 is accomplished by a suitable spring element 40 best shown in Figs. 4 and 6 having a straight portion 41 with coils 42 at each end thereof, each coil 42 having free ends 43 spaced from the straight portion 41. The straight portion 41 of the spring element 40 is crimped at the center thereof at 410 and is pivotally connected at the said center crimp 410 to the inside corner of the angular anchorage strip 21 by means of a spring retaining loop 44 struck inwardly therefrom. The free ends 43 of the coils 42 of the spring element 40 are pivotally connected to the lever element 31 at spaced loops 45 formed thereon. Such spring loaded pivoted and linked lever construction of the actuating mechanism 30 is preferable inasmuch as the actuating mechanism occupies a minimum of space and is positive in constantly urging the swingable strip 25 to swing outwardly toward its horizontal position as shown in Fig. 6 and in swinging the said swingable strip to its downwardly disposed position shown in Fig. 2 responsive to the closing of the door 11.

In wide door installations where a long hinge finish molding 20 is employed above the vertically sliding window 14, it may be desirable to provide one or more over-center spring elements 46 to resiliently urge that portion of the swingable strip 25 remote from the actuating mechanism 30 to the horizontal or depending substantially vertical position to which the said actuating mechanism 30 swings the swingable strip 25 whereby to maintain the entire length of the swingable strip 25 in the desired horizontal or vertical alignment.

The over-center spring element 46 preferably employed is shown in Fig. 4 to be in the form of a hair pin spring having a coil 47 at its apex. One arm 48 of the hair pin spring 46 is hingedly connected to the depending leg 23 of the angular anchorage strip 21 by a looped clip 49 secured to the anchorage strip 21, and the other arm 50 thereof is hingedly connected to the swingable strip 25 by a looped clip 51 secured thereto by rivets 52. The end of the arm 48 of the over-center spring 46 is provided with a hump 480 which is positioned in a depression 53 formed in the angular anchorage strip 21 to prevent longitudinal displacement of the said over-center spring element. The end of the arm 50 of the spring 46 is suitably kinked at 500 into substantial parallel relationship with respect to the loop 510 of the looped clip 51 whereby to avoid binding of the spring arm 50 therein. The loops 490 and 510 of the looped clips 49 and 51 are so located in respect to the angular anchorage strip 21, the swingable strip 25 and the hinge rolls 220 and 250, all respectively, that the swingable strip 25 will be spring loaded by the over-center spring 47 toward either its horizontal position or its depending substantially vertical position responsive to approximately the half-way movement of the swingable strip 25 by the actuating mechanism 30 from either one of said positions to the other.

The over-center spring element 46 also serves an important function when a hinged finish molding 20 is employed over a relatively wide door inasmuch as the rear portion of a front hinged door closes somewhat later than the front portion thereof. Accordingly, when the fixed door element 13 contacts the actuating mechanism 30 to swing the swingable strip 25 of the hinged finished molding 20 from its horizontal outward position to its vertical downward position, the over-center spring element 46 spaced rearwardly remote from the actuating mechanism 30 holds the rear portion of the swingable strip 25 horizontally outward until the rear portion of the door is nearly closed, at which time the over-center spring element 46 functions to snap the swingable strip 25 from its horizontal outward position to its downward position. This delayed action on the over-center spring element 46 is accomplished as the result of a twisting of the swingable strip 25 during the initial swinging movement of the forward portion thereof by the actuating mechanism 30 responsive to the fixed door element 13 contacting the contact element 310 of the lever 31 of the said actuating mechanism 30.

In Fig. 7 is shown an alternate construction by means of which the flashing element 28 may be eliminated, thus presenting a more complete ornamental effect of the hinged finished molding 20. The embodiment of the hinged finish molding 200 disclosed in Fig. 7 is like and similar to the embodiment of the invention 20 shown in Figs. 1-6 inclusive except that the flashing element 28 has been eliminated, the swingable strip 25 has been made narrower, and an ornamental strip 55 has been secured to the outside of the shortened swingable strip 25. The upper portion 550 of the said ornamental strip 55 extends over and in contact with the hinge roll 220 of the horizontal leg 22 of the angular anchorage strip 21, thus providing a weather seal between the anchorage strip 21 and the swingable strip 25.

Although but one embodiment and one modification and one type of installation of the invention has been disclosed and described in detail, it is obvious that hinged finish moldings may be employed over any type of swinging door and that many changes may be made in the size, shape, arrangement and detail of the various elements of the invention without departing from the spirit and scope thereof as defined by the appended claims.

I claim:

1. A hinged finish molding for automobile door headers above a vertically opening door window of the type employing no window header and comprising a depending strip mountable on said door header, a swingable strip adapted to hingedly depend from said door header and being outwardly spaced from said depending strip, means constantly urging said swingable strip horizontally outwardly, and means associated with said swingable strip and contactable by a fixed door element when said door is closed to swing said swingable strip downwardly to form a molding overlying the said door window.

2. A hinged molding for weather sealing the joint between the door header of an automobile body and the vertically opening door window of an automobile door and comprising a depending strip mountable on said door header and carrying outwardly facing weather stripping, a swingable strip carrying inwardly facing weather stripping and being outwardly spaced from said depending strip, means constantly urging said swingable strip horizontally outwardly, and means associated with said swingable strip and contactable by a fixed door element when said door is closed to swing said swingable strip downwardly to form a glass channel for said door window, the said weather stripping providing a seal for said door window.

3. A hinged finish molding for use at the joint between the door header and the vertically opening door window of automobiles and comprising a fixed strip securable to the door header to depend therefrom, a molding strip hingedly mountable along said door header and outwardly with respect to said fixed strip, and spring loaded actuating mechanism normally urging said hinged molding horizontally outwardly about its hinge and including a contact element contactable by a fixed door member when said door is closed to swing said hinged molding downwardly to form a glass channel for said door window.

4. A hinged finish molding for use at the joint between the door header and the vertically opening door window of an automobile and comprising a fixed strip securable to the door header and being adapted to depend therefrom, a molding strip hingedly mountable along said door header and outwardly in respect to said fixed strip, spring loaded actuating mechanism normally urging said hinged strip horizontally outwardly about its hinge and including a contact element contactable by a fixed door member when said door is closed to swing said hinged molding downwardly to form a glass channel for said door window, and over-center spring means located remotely from said spring loaded mechanism for resiliently urging said hinged strip in either the horizontally outward or the vertically downward position to which it may be swung by said actuating mechanism.

5. A hinged finish molding for weather sealing the joint between the door header and the vertically opening door window of an automobile and comprising a fixed strip securable to the door header with a portion thereof depending therefrom, an ornamental molding strip hingedly connected to said fixed strip and outwardly in respect to the depending portion thereof, spring loaded actuating mechanism connected to said fixed strip and said hinged molding strip and urging said molding strip horizontally outwardly about its hinge and including a contact element contactable by a fixed door member when said door is closed to swing said hinged molding strip downwardly to form a glass channel for said door window, and over-center spring means located remotely from said spring loaded mechanism and resiliently urging said hinged molding strip in either the horizontally outward or the vertically downward position to which it may be swung by said actuating mechanism.

6. A hinged finish molding for weather sealing the joint between the door header and the vertically opening door window of an automobile and comprising a fixed strip securable to the door header with a portion thereof depending therefrom, an ornamental molding strip hingedly connected to said fixed strip outwardly in respect to the depending portion thereof, spring loaded actuating mechanism connected to said fixed strip and said hinged molding strip and urging said molding horizontally outwardly about its hinge and including a contact element contactable by a fixed door member when said door is closed to swing said hinged molding strip downwardly to form a glass channel for said door window.

7. A hinged finish molding for weather sealing the joint between the door header and the vertically opening door window of an automobile and comprising a fixed angular anchorage strip secured along one leg to the door header with the other leg thereof depending therefrom, an ornamental molding strip hingedly connected to said anchorage strip and outwardly in respect to the depending leg thereof, spring loaded actuating mechanism constantly urging said hinged ornamental molding strip horizontally outwardly and including a lever hingedly connected to said ornamental molding strip and to said anchorage strip and a spring element disposed between said anchorage strip and said lever, the said lever being engageable by a fixed door member when said door is closed to swing said hinged ornamental molding strip downwardly to form a glass channel for said door window.

8. A hinged finish molding for weather sealing the joint between the door header and the vertically opening door window of an automobile and comprising a fixed angular anchorage strip securable along one leg to the door header with the other leg thereof depending therefrom, an ornamental molding strip hingedly connected to said anchorage strip and outwardly in respect to the depending leg thereof, spring loaded actuating mechanism constantly urging said hinged ornamental molding strip horizontally outwardly and including a lever hingedly connected to said ornamental molding strip and linked through a hinged link to said anchorage strip and a spring element connected to said anchorage strip and said lever, the said lever being engageable by a fixed door member when said door is closed to swing said hinged ornamental molding strip downwardly to form a glass channel for said door window, and over-center spring means located remote from said actuating mechanism and resiliently urging said hinged molding strip in either the horizontally outward or the vertically downward position to which it may be swung by said actuating mechanism.

9. A hinged finish molding for weather sealing the joint between the door header and the vertically opening door window of an automobile and comprising a fixed angular anchorage strip securable along one leg to the door header with the other leg thereof depending therefrom, an ornamental molding strip hingedly connected to said anchorage strip and outwardly in respect to the depending leg thereof, spring loaded actuating mechanism constantly urging said hinged ornamental molding strip horizontally outwardly and including a lever hingedly connected to said ornamental strip and linked through a hinged link to said anchorage strip and a spring element connected to said anchorage strip and said lever, the said lever being engageable by a fixed door member when said door is closed to swing said hinged ornamental molding strip downwardly to form a glass channel for said door window.

10. A hinged finish molding for weather sealing the joint between the door header and the vertically opening door window of an automobile and comprising a fixed angular anchorage strip securable along one leg to the door header with the other leg thereof depending therefrom, an ornamental molding strip hingedly connected to said anchorage strip and outwardly in respect to the depending leg thereof, spring loaded actuating mechanism connected to said anchorage strip and said hinged ornamental molding strip and urging said molding strip horizontally outwardly about its hinge and including a contact element contactable by a fixed door member when said door is closed to swing said hinged ornamental molding strip downwardly to form a glass channel for said door window, and weather stripping on the depending leg of said anchorage strip and on said molding strip and disposed in spaced opposed relationship when said door is closed and providing a window seal in said glass channel.

11. A hinged finish molding for weather sealing the joint between the door header and the vertically opening door window of an automobile and comprising a fixed angular anchorage strip securable along one leg thereof to the door header with the other leg thereof depending therefrom, an ornamental molding strip hingedly connected to said anchorage strip and outwardly in respect to the depending leg thereof, spring loaded actuating mechanism constantly urging said hinged ornamental molding strip horizontally outwardly and including a lever hingedly connected to said ornamental strip and linked through a hinged link to said anchorage strip and a spring element connected to said anchorage strip and said lever, the said lever being engageable by a fixed door member when said door is closed to swing said hinged ornamental molding downwardly to form a glass channel for said door window, and weather stripping on the depending leg of said anchorage strip and on said molding strip and disposed in spaced opposed relationship when said door is closed and providing a window seal in said glass channel.

12. A hinged finish molding for weather sealing the joint between the door header and the vertically opening door window of an automobile and comprising a fixed angular anchorage strip securable along one leg to the door header with the other leg thereof depending therefrom, a swingable strip, hinge means connecting said swingable strip to said anchorage strip in spaced relationship to the depending leg thereof, an ornamental strip overlying said swingable strip and formed to maintain contact with said anchorage strip during the swinging thereof in respect thereto, and actuating means resiliently urging said swingable strip horizontally outwardly and being contactable by a fixed door member when said door is closed to swing said swingable strip and the ornamental strip carried thereby downwardly to form a glass channel.

13. A hinged finish molding for weather sealing the joint between the door header and the vertically opening door window of an automobile and comprising a fixed angular anchorage strip securable along one leg to the door header with the other leg thereof depending therefrom, a swingable strip, hinge means connecting said swingable strip to said anchorage strip in spaced relationship to the depending leg thereof, and an ornamental strip overlying said swingable strip and formed to maintain contact with said anchorage strip during the swinging thereof in respect thereto.

14. A hinged finish molding for weather sealing the joint between the door header and the vertically opening door window of an automobile and comprising a fixed angular anchorage strip securable along one leg to the door header with the other leg thereof depending therefrom, a swingable strip, hinge means connecting said swingable strip to said anchorage strip in spaced relationship to the depending leg thereof, an ornamental strip overlying said swingable strip and formed to maintain contact with said anchorage strip during the swinging thereof in respect thereto, actuating means resiliently urging said swingable strip horizontally outwardly and being contactable by a fixed door member when said door is closed to swing said swingable strip and the ornamental strip carried thereby downwardly to form a glass channel, and over-center spring means longitudinally spaced from said actuating means for resiliently maintaining said swingable strip in either position to which it is swung by said actuating means.

15. A hinged finish molding for weather sealing the joint between the door header and the vertically opening door window of an automobile and comprising a fixed regular anchorage strip securable along one leg to the door header with the other leg thereof depending therefrom, a swingable strip, hinge means connecting said swingable strip to said anchorage strip in spaced relationship to the depending leg thereof, an ornamental strip overlying said swingable strip and formed to maintain contact with said anchorage strip during the swinging thereof in respect thereto, actuating means resiliently urging said swingable strip horizontally outwardly and contactable by a fixed door member when said door is closed to swing said swingable strip and the ornamental strip carried thereby downwardly to form a glass channel, and weather stripping on said swingable element and on said anchorage element and disposed in opposite and spaced relationship when said door is closed and providing a window seal in said glass channel.

16. A hinged finish molding for an automobile door header above a vertically opening door window of the type employing no window header and comprising a depending strip securable on said door header, a swingable strip including a hinge element securable to said door header in depending and outwardly spaced relation to said depending strip, means for constantly urging the said swingable strip horizontally outwardly, and means associated with said strip and contactable by a fixed door element when said door is closed to swing said swingable strip downwardly to form a molding overlying the said door window, and resilient means overlying the hinge element and weather sealing the same.

17. A hinged finish molding for weather sealing the joint between the door header and the vertically opening door window of an automobile and comprising a fixed strip securable to the door header with a portion thereof depending therefrom, an ornamental molding strip hingedly connected to said fixed strip and outwardly in respect to the depending portion thereof, spring loaded actuating mechanism connected to said fixed strip and said molding strip and urging said molding strip horizontally outwardly about its hinge and including a contact element contactable by a fixed door member when said door is closed to swing said molding strip downwardly to form a glass channel for said door window, and resilient means overlying the hinge connection between said fixed strip and said molding strip and weather sealing the same.

18. A hinged finish molding for a door header adapted to be affixed above a swinging automobile door comprising a swingable strip adapted to be hingedly connected to said door header to overlie the joint between the door header and the door when said door is closed, means constantly urging said swingable strip horizontally outwardly to swing said swingable strip outwardly when said door is opened, and means associated with said strip and contactable by said door as said door is closed to swing said swingable strip downwardly to form a molding weather sealing said joint between the door header and the door when said door is fully closed.

19. A hinged finish molding for use at the joint between the door header above a swinging automobile door and said door and comprising a molding strip hingedly mountable along said door header, and spring loaded actuating mechanism urging said hinged molding to swing horizontally outwardly about its hinge when said door is opened and including a contact element associated with said molding and contactable by the door when said door is closed to swing said hinged molding downwardly over the said joint.

20. A hinged finish molding for use at the joint between the door header above a swinging automobile door and said door and comprising a molding strip hingedly mountable along said door header, spring loaded actuating mechanism located near the front of said molding strip and urging said hinged molding strip to swing horizontally outwardly about its hinge when said door is opened, said actuating mechanism including a contact element associated with said molding and contactable by the door as said door is closed to swing said hinged molding downwardly over said joint, and over-center spring means located rearwardly remotely from said spring loaded actuating mechanism and resiliently urging said hinged strip in either the horizontally outward or the vertically downward position to which it may be swung by said actuating mechanism, the said molding strip being sufficiently resilient to permit some twisting thereof between the actuating mechanism and the over-center spring means whereby to delay action of the over-center spring means responsive to the closing of the door until the door is nearly closed.

21. A hinged finish molding for automobile door headers above a swing-opening door of the type employing no window header and having a vertically opening window, said hinged molding being adapted to be secured on said door header and comprising a depending strip, a swingable strip hingedly secured on said molding and outwardly spaced from said depending strip, said swingable strip being in a hingedly depending relationship with said door header when said molding is secured thereon, means constantly urging said swingable strip horizontally outwardly, and means associated with said strip and contactable by a fixed door element when said door is closed to swing said swingable strip downwardly to form a molding overlying the said door window.

22. A hinged finish molding for automobile door headers above a swing-opening door of the type employing no window header and having a vertically opening window, said hinged molding being adapted to be secured to said door header and comprising a depending strip, a resilient swingable strip hingedly secured on said molding and outwardly spaced from said depending strip, said swingable strip being in a hingedly depending relationship with said door header when said molding is secured thereon, means constantly urging said swingable strip horizontally outwardly, means associated with said strip and contactable by a fixed door element when said door is closed to swing said swingable strip downwardly forming a molding overlying the said door window, and spring means spaced from said means and urging said swingable strip horizontally outwardly and delaying the downward swinging of said swingable strip until said door is nearly closed.

23. A hinged finish molding for weather sealing the joint between the door header and the vertically opening door window of a swing-opening automobile door, comprising a fixed angular anchorage strip adapted to be secured along one leg to the door header with the other leg thereof depending therefrom, a swingable strip, hinge means connecting said swingable strip to said anchorage strip in spaced relationship to the depending leg thereof, means constantly urging said swingable strip horizontally outwardly, means associated with said strip and contactable by a fixed door element when said door is closed to swing said swingable strip downwardly to form a molding overlying the said door window.

24. A hinged finish molding for weather sealing the joint between the door header and the vertically opening door window of a swing-opening automobile door, comprising a fixed angular anchorage strip adapted to be secured along one leg to the door header with the other leg thereof depending therefrom, a resilient swingable strip, hinge means connecting said swingable strip to said anchorage strip in spaced relationship to the depending leg thereof, means constantly urging said swingable strip horizontally outwardly, means associated with said strip and contactable by a fixed door element when said door is closed to swing said swingable strip downwardly to form a molding overlying the said door window, and spring means spaced from said means and urging said swingable strip horizontally outwardly and delaying the downward swinging of said swingable strip until said door is nearly closed.

25. A hinged finish molding for a door header above a swinging automobile door, a swingable strip adapted to be hingedly connected to said door header and overlying the joint between the door header and the door when said door is closed, means constantly urging said swingable strip horizontally outwardly to swing said swingable strip outwardly when said door is opened, means associated with said strip and contactable by said door as said door is closed to swing said swingable strip downwardly to form a molding weather sealing said joint between said door header and said door when said door is fully closed, and means at the end of said swingable strip remote from said contactable means for opposing the movement of said strip downwardly to form a molding weather sealing said joint.

26. A hinged finish molding for a door header above a swinging automobile door, a swingable strip adapted to be hingedly connected to said door header and overlying the joint between the door header and the door when said door is closed, means constantly urging said swingable strip horizontally outwardly to swing said swingable strip outwardly when said door is opened, means associated with said strip and contactable by said door as said door is closed to swing said swingable strip downwardly to form a molding weather sealing said joint between said door header and said door when said door is fully closed, and means at the end of said swingable strip remote from said contactable means for twisting said strip lengthwise of said strip and in opposition to the operation of said contactable means.

27. A door header above a swinging automobile door and comprising a swingable strip hingedly connected to said door header and overlying the joint between said door header and the door when said door is closed, means constantly urging said swingable strip horizontally outwardly to swing said swingable strip outwardly when said door is opened, and means associated with said strip and contactable by said door as said door is closed to swing said swingable strip downwardly to form a molding weather sealing said joint between said door header and said door when said door is fully closed.

28. An automobile door header above a swing-opening door and comprising a depending molding strip secured on said door header, a swingable strip hingedly secured on said header and outwardly spaced from said depending strip, means constantly urging said swingable strip horizontally outwardly, and means associated with said strip and contactable by a fixed door element when said door is closed to swing said swingable strip downwardly to form a molding overlying said door.

29. An automobile door header above a swing-opening door and comprising a depending molding strip extending beneath said door header, a resilient swingable strip hingedly secured on said door header and outwardly opposite from said depending strip, means constantly urging said swingable strip horizontally outwardly, means associated with said strip and contactable by a fixed door element when said door is closed to swing said swingable strip downwardly to form a molding overlying said door, and means spaced from said last mentioned means and adjacent the opposite end of said swingable strip and urging said swingable strip horizontally outwardly to twist said swingable strip and to delay the downward swinging movement of said swingable strip until said door is nearly closed.

JAMES H. WERNIG.

REFERENCES CITED

The following references are of record in the file of this patent:

UNITED STATES PATENTS

| Number | Name | Date |
|---|---|---|
| 1,545,694 | Potter | July 14, 1925 |
| 1,646,743 | Bernard | Oct. 25, 1927 |

FOREIGN PATENTS

| Number | Country | Date |
|---|---|---|
| 142,682 | Switzerland | Jan. 2, 1931 |